United States Patent Office 3,275,667
Patented Sept. 27, 1966

3,275,667
PROCESS FOR THE MANUFACTURE OF PHOSPHATE ESTER DERIVATIVES OF POLYALKYLENE GLYCOLS
Johann Bohunek, Burgkirchen, Upper Bavaria, Germany, assignor to Farbwerke Hoechst Aktiengesellschaft vormals Meister Lucius & Brüning, Frankfurt am Main, Germany, a corporation of Germany
No Drawing. Filed Jan. 21, 1963, Ser. No. 252,619
Claims priority, application Germany, Feb. 24, 1959, F 27,782
11 Claims. (Cl. 260—403)

This is a continuation-in-part application of U.S. patent application Ser. No. 10,564, filed February 24, 1960, and now abandoned.

It is known that polyethylene glycols or addition products thereof can be esterfied with phosphorus oxygen acids. Due to the different reactivity of the various hydrogen atoms of the phosphoric acids, however, always partial esterification takes place only so that partial phosphoric acid esters having acid numbers of up to about 10 and which are liquid or have a low viscosity are obtained.

Now, I have found that novel surface-active products that are suitable for many purposes are obtained by esterifying, in a manner as such known, compounds that contain polyalkylene gylcols and correspond to the general formula

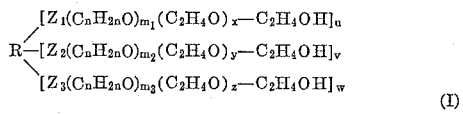
(I)

with ortho-phosphoric acid, phosphorus oxychloride, phosphorus pentoxide, meta-phosphoric acid, pyrophosphoric acid or any other polyphosphoric acid formed by further hydrolysis from ortho-phosphoric acid. In this process, the esterification mixture is heated, while continuously discharging the distillation products liberated, to temperatures in the range of at least 190 and about 280° C., preferably 220 and 260° C., until a product is formed which has the desired degree of condensation and the desired low acid number in the range of about 0 and about 4, preferably 0 and 2. The heating period required can vary within wide limits and depends on the temperature applied and, in particular, on the constitution and the cross-linking ability of the compounds of the Formula I used. The heating period required also depends on the quantity of starting compounds used in the reaction mixture as well as on the performance of the reaction with regard to evacuation of the water formed. In general, heating periods from 5 minutes to about 25 hours are used.

In the general Formula I, R represents hydrogen or an aromatic radical or a saturated or unsaturated aliphatic or cycloaliphatic radical, $n$ represents the integers 2 to 4, in particular 3 or 4, $u$ stands for an integar from 1 to 10, preferably 1 to 3, $v$ and $w$ represent integers from 0 to 10, preferably 0 to 3, $x$, $y$ and $z$ represent integers from 1 to about 200, in particular 1 to 100, and $m_1$, $m_2$ and $m_3$ stand for integers from 0 to about 200, in particular from 0 to 100, the sums of the correlated integers $x$ and $m_1$, $y$ and $m_2$ and $z$ and $m_3$, however, not exceeding values ranging from 1 to about 200. $Z_1$, $Z_2$, and $Z_3$, and which may be equal to or different from each other, represent an oxygen atom or a sulfur atom, or one of the groups —COO—, —CONR$_1$—, SONR$_1$—, —SO— or —SO$_2$— in which formlae R$_1$ represents a preferably low molecular saturated alkylene radical, in particular in alkylene radical that has 1 to 4 carbon atoms, or a radical of the formula —$(C_nH_{2n}O)_{m_1}(C_2H_4O)_xC_2H_4OH$ wherein $m_1$, $n$ and $x$ have the meanings given above.

The polyalkylene chains of the compounds of the Formula I may contain, in any desired sequence, butylene oxid and/or propylene oxide members. For the practicability of the reaction it is merely decisive that the polyalkylene chain terminates with an ethylene glycol member. The term $(C_nH_{2n}$—O) thus represents an ether chain which contains, once or several times, in any desired sequence, the groups, $C_2H_4O$, $C_3H_6O$ and $C_4H_8O$.

In the compound indicated below, designated as Example 1 of Formula I, the form modified with propylene glycol thus reads:

$CH_3(CH_2)_{16}$—$CH_2O(C_3H_6O)_{20}$—$(C_2H_4)_9$—$C_2H_4OH$

As particularly suitable polyalkylene glycols that may be used as starting materials to carry out the process of the present invention, polybutylene or polypropylene glycols of uniform or mixed composition are mentioned.

Representatives of this class are:

(2)  $HOC_2H_4O(C_2H_4O)_{14}$—$(C_4H_8O)_{10}$—$(C_2H_4O)_{19}$—$C_2H_4OH$
(2)  $HOC_2H_4O(C_2H_4O)_{14}$—$(C_4H_8O)_{10}$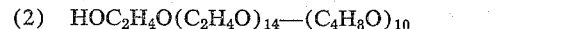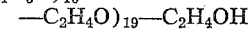—$(C_2H_4O)_{14}$—$C_2H_4OH$
(3)  $HOC_2H_4O(C_2H_4O)_{19}$—$(C_3H_6O)_{15}$—$(C_4H_8O)_{10}$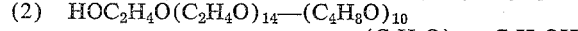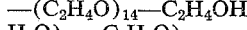—$(C_3H_6O)_{15}$—$(C_2H_4O)_{19}$—$C_2H_4OH$
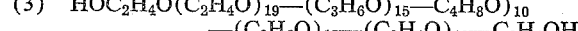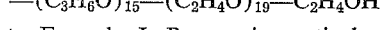

Referring again to Formula I, R may in particular stand for one of the following radicals:

An aromatic radical containing 1 or 2 benzene nuclei, preferably a phenyl or a naphthyl radical, further phenyl or naphthyl radicals which either contain such substituents as are inert towards the esterification reaction with phosphoric acid, for example, halogen or nitro groups, or which are substituted by alkyl radicals that contain 1 to 12 carbon atoms; further, phenyl or naphthyl radicals which are linked by low molecular alkylene radicals or by hetero atoms or by such atom groupings as —CO—, —SO—, or —SO$_2$—; further, saturated or unsaturated, aliphatic hydrocarbon radicals which preferably contain 1 to 30 carbon atoms and which may also be branched or be substituted by phenyl or naphthyl radicals, or such aliphatic hydrocarbon radicals whose chains may be interrupted by hetero-atoms, in particular oxygen. As such aliphatic hydrocarbons there enter into consideration preferably polyalkylene glycol radicals of the formula —$(C_nH_{2n}O)_{m_1}(C_2H_2O)_xC_2H_4OH$ in which $m_1$, $n$ and $x$ have the meanings given above. In said Formula I, R may also stand for a cycloaliphatic hydrocarbon radical containing 5 to about 22 carbon atoms, which may be partially unsaturated and also be substituted by phenyl or alkyl radicals containing 1 to 12 carbon atoms. As examples of such compounds there are mentioned: cyclohexane, tetrahydronaphthalene, decahydronaphthalene, or dodecyltetrahydronaphthyl radicals. In case the indices $m_1$, $m_2$ and $m_3$ in the general Formula I are equal to O, there are concerned pure polyethylene glycol derivatives of the general formula

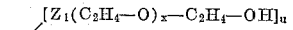
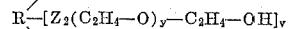
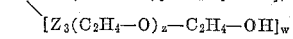  (Ia)

in which R, $Z_1$, $Z_2$, $Z_3$, $x$, $y$, $z$, $u$, $v$, and $w$ have the meanings given above.

The products obtained by the process of the present invention can be applied for various technical purposes. Owing to their surface-activity, they are suitable for all purposes for which surface-active substances are required, for example, as adhesives, thickening agents in pigment printing processes, as sizing agents, finishing agents, emulsion stabilizers, protective colloids, milking fats, flotation agents, emulsifiers, demulsifiers, plasticizers for plastics, and the like. They constitute products which are more or less highly viscous and have a consistence ranging from that of ointments or waxes to that of rubber-like products which are stringy in the heat, or which upon standing for prolonged periods at room temperature solidify to wax-like masses of changing opacity.

The decisive features of the process of the present invention are: the applied high reaction temperature of the esterification mixture, the prolonged reaction period of several hours and the simultaneous and continuous complete discharging of the distillation products liberated from the mixture at that temperature. These distillation products which substantially consist of water vapour, are removed either by applying a vacuum of at least 15 mm. Hg, or by introducing into the cycle a liquid or gaseous agent which entrains them; this removal is brought about most simply with the aid of an inert protective gas, such as nitrogen, carbon dioxide, or the like.

If the distillation products are not discharged continuously, the water that forms in considerable amounts causes a decomposition of the molecules of the polyethylene glycols or derivatives or addition products thereof.

The course which the reaction takes in the process of the present invention is not yet completely cleared up. According to our actual knowledge, it is assumed that at the beginning of the reaction there form at first acid esters of the phosphoric acids mentioned, which, under the action of the liberated water and of the high temperature applied are split off at least partially, thereby continuously regenerating phosphoric acid which, under the reaction conditions, anew esterifies the hydroxyl groups of the polyethylene glycol chains, so that, owing to the long reaction periods, the esterification is practically driven up to the pure tertiary ester. This assumption is supported by the fact that the analysis indicates phosphorus in the molecule of the reaction products and by the low acid numbers as mentioned to be 0 to 2. It may also be possible that in the assumed intermediary ester cleavage some ethylene oxide is separated at the free ends of the polyethylene glycol ether chains from which there may intermediarily form dioxane.

When assuming, for the purpose of simplification, a monomolecular reaction course, and when using starting substances of the Formula Ia, there is obtained a reaction product corresponding to the following formula

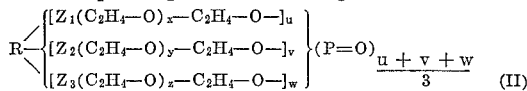   (II)

It is less probable that, in the process of the invention, the initially formed partial phosphoric acid ester is fully hydrolyzed and that, in addition to the regenerated phosphoric acid in the case of a starting substance of the Formula I, an unsaturated organic compound is formed as intermediary product which corresponds to the general formula

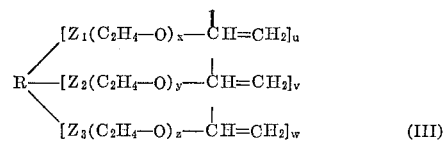   (III)

and which, under dissolution of the double bondages by interlinking or cross-linking with molecules that have equal constitution, would form condensation products of more or less high molecular weight and consisting of members of the general formula

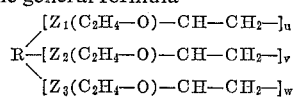   (IV)

In the above indicated general formulae, the symbols R, $Z_1$, $Z_2$, $Z_3$ $u$, $v$, and $w$ have the meanings given in Formula I.

However, it may also be possible that the reaction to the tertiary phosphoric acid ester of the general Formula III and the reaction to the phosphorous-free high molecular condensation product of the Formula IV proceed simultaneously and side by side, and that the reaction products constitute mixtures of compounds of the Formulae II and IV or mixed products from compounds of the Formulae II and IV in varying proportions.

For the technical effect of the process of the present invention it is of no importance which of these reaction hypotheses is true. This effect is characterized in that novel products are obtained which may be reproduced and which have valuable properties making them particularly suitable for a great variety of applications.

In its most general embodiment, the process consists in completely phosphatizing a starting product of the Formula I or Ia, prepared under the operational conditions given in any manner desired, at a temperature in the range of 190 and 260° C., with a prolonged digestion period, while continuously and energetically removing volatile products, such as water etc. set free by the condensation reactions that are taking place. In a preferred embodiment, the starting material of the Formula I or Ia, from a polyalkylene glycol and an organic compound capable of adding the grouping

is formed in situ and at the same time as the phosphatization takes place. The separate preparation and isolation of the starting product of the Formula I or Ia can thus be dispensed with, and the formation of this starting product becomes thus an inherent part of the process of the invention which nevertheless remains a one-stage process and can be carried out in one single reaction vessel.

The starting substance chosen of Formula I or Ia may also be formed in situ in such a manner that the oxalkylation for the formation of the polyglycolether chains is effected simultaneously with the phosphatization, or that first the phosphatization and then exthoxylation is effected.

Excess amounts of phosphoric acid can remain in the product as they do not disturb for most of the purposes of application provided for. If necessary, it can be neutralized up to about pH 7 by introducing ammonia or by adding to the molten reaction mass bases, such as monoethanol amine, propanol amine, methylamine, alkylene oxides, such as ethylene oxide or propylene-oxide or by adding the reaction product in dry state at 80 to 90° C. with salts of strong, in particular mineral bases with weak mineral or organic acids, such, for example, as sodium-, potassium-, ammonium-, calcium- or magnesium-acetate, sodium-, potassium- or ammonium-formate, sodium-, potassium- or ammonium-phosphate as well as the corresponding carbonates or bicarbonates, or by precipitating the phosphoric acid from the aqueous solutions of the reaction products by neutralization as insoluble salt, for example, calcium phosphate.

The process of the present invention can be carried out at normal, reduced or elevated pressure. Optionally there may be present as entrainer from the cycle an inert liquid which, on the one hand, facilitates the continuous discharging of the volatile by-products and, on the other, may serve as solvent for the starting material used in each particular case. As such liquids there enter into consideration: ethylene chloride, tetraline, carbon tetrachloride, benzene, xylene, tetrahydrofurane, further dialkyl glycol ethers or dibutyl ethers and particularly dioxane.

As representatives of the derivatives of polyalkylene glycol ether of the general Formula I which are to be reacted, there are mentioned by way of example:

(A) Pure polyethylene glycols based on ethylene oxide or glycol.

(B) Mixed polyalkylene glycols which contain several units of ethylene oxide, propylene oxide and/or butylene oxide within their chain and which carry one or several etheneoxy groups in terminal position.

The compounds of the groups specified under (A) and (B) may have molecular weights of up to 5,000. The simplest compound of both groups contains at least 2 etheneoxy groups.

(C) Ethers of the types of compounds specified under (A) and (B) above with alcohols or aromatic oxy compounds.

As alcohols, there are mentioned for example: methanol, n-butanol, n-octanol, n-decyl alcohol, lauryl alcohol, stearyl alcohol, melissyl alcohol, straight chain aliphatic alcohols such as those obtained by the Ziegler process, oleyl alcohol, branched chain alcohols prepared by the oxo-synthesis such as isotridecyl alcohol and isodecyl alcohol, benzyl alcohol, cyclohexanol, 1,5-pentanediol, 1,6-hexanediol, 1,10-decanediol, 1,12-octadecanediol, 1,2-cyclohexanediol, 2,2-dimethylpropane-1,3-diol, glycerine, polyglycerine, pentaerythrite, polypentaerythrite, hexanetriol, trimethylolpropane, sorbitol, sugar, starch, as well as the alcohols formed by the reduction of the carboxylic acids specified hereunder under (G). As aromatic oxy compounds, there may further be used: phenol, β-naphthol, pyrocatechol, 2,6-dioxy-naphthalene, dioxy-benzophenone, bis-phenols, p-tert.butylphenol, nonylphenol, 2,6-dichlorophenol, p-nitrophenol, tetrahydro-β-naphthol, alkylphenol-formaldehyde resins, alizarine. By their formulae there are mentioned:

Semi-ethers formed with alcohols of the general formula $$R—[O—(C_2H_4—O)_x—C_2H_4—OH]_u$$

for instance (1) $CH_3—(CH_2)_{16}—CH_2—O—(C_2H_4—O)_{19}—C_2H_4—OH$ (2) 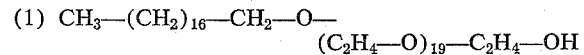

(3) 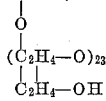

(4) 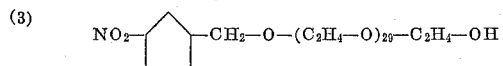

(5) 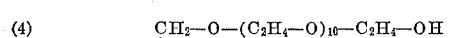

(6) 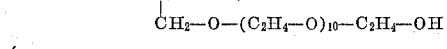

(7) 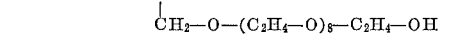

(8) 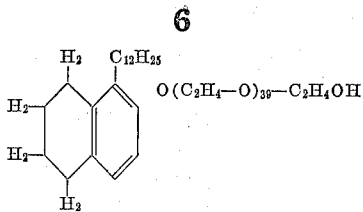

(9) 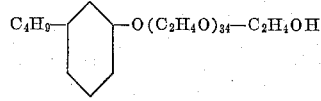

(10) 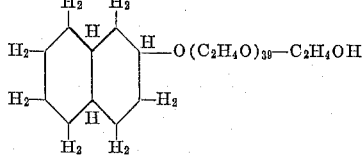

(11) 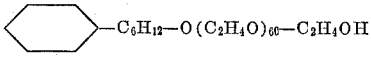

(12) 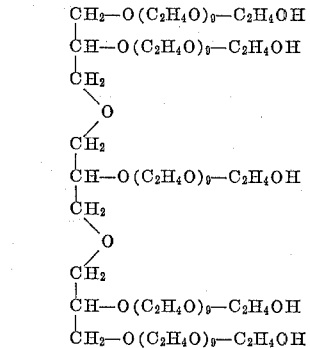

(13) 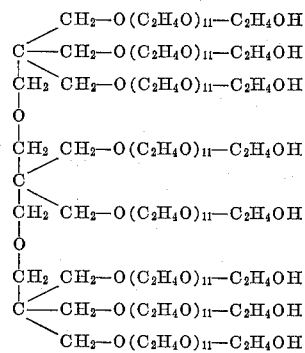

Polyglycol-semiethers of the general formula $$R—[O—(C_2H_4—O)_x—C_2H_4—OH]_u$$

formed with aromatic oxy bodies, for example, (1) 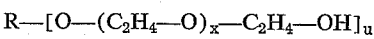

(2) 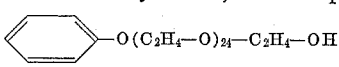

(3) 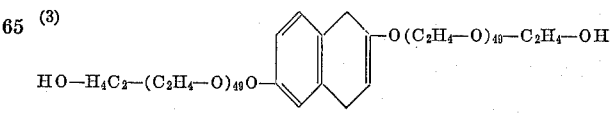

(4) 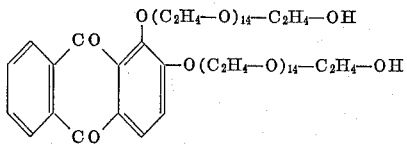

(5) 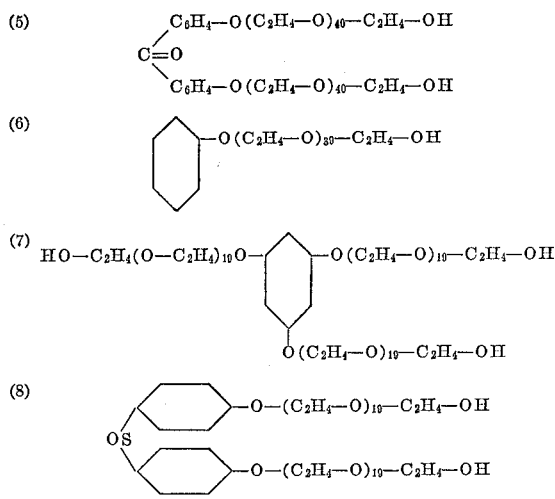

(6)

(7)

(8)

(D) Monoesters of polyethylene glycols of the general formula $$R[COO(C_2H_4-O)_x-C_2H_4-OH]$$

formed with organic acids, for example, (1) $CH_3-(CH_2)_{14}-COO(C_2H_4-O)_{21}-C_2H_4-OH$ (2) 
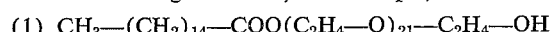

(3) 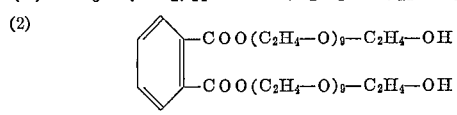

(4) 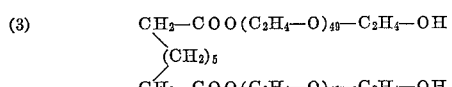

(5) $CH_3-CH=CH-CH=CH-CH_2-$
$COO(C_2H_4-O)_{39}-C_2H_4-OH$ (6) 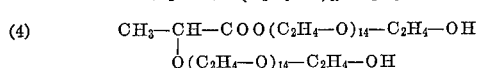

(E) Products formed by the addition of the compounds of groups (A) and (B) to amines such as aniline, lauryl-N-methylamine, β-naphthylamine, 4,4′-diaminodiphenyl-methane. These compounds correspond to the general formulae

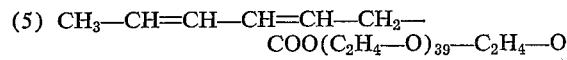

and

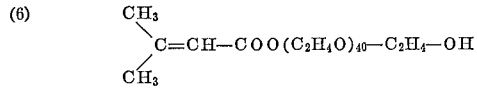

for example, (1) 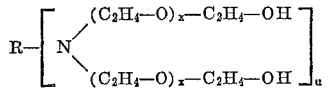

(2) 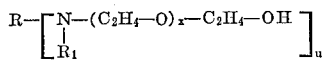

(3) 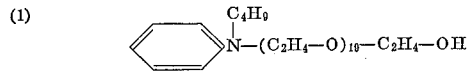

(4) 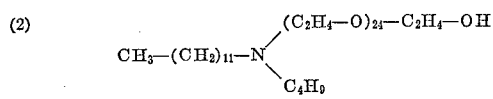

(5) 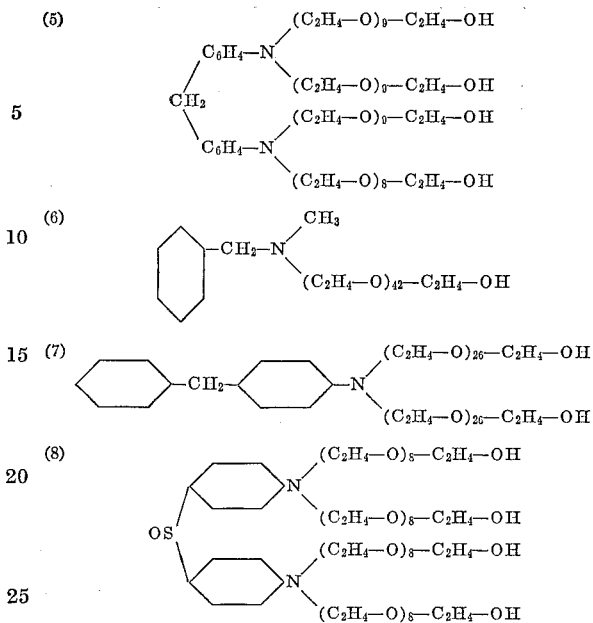

(6)

(7)

(8)

(F) The products formed by the addition of the compounds of groups (A) and (B) to carboxylic acid amides such as the amides and lower monoalkyl amides of the carboxylic acids hereinafter specified under (G). Furthermore, the products formed by the addition to sulfonic acid amides such as octadecyl-sulfonamide, p-toluene-sulfonamide, benzene-disulfonamide, monochloro-naphthalene-sulfonamide, benzene - N - methyl-sulfonamide. With regard to their constitution, these types of compounds correspond to the general formulae $$R-[CO-N(C_2H_4-O)_x-C_2H_4-OH]_u$$
$$\phantom{R-[CO-N}R_1$$

and

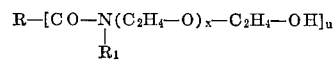

for example, (1) 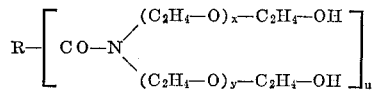

(2) 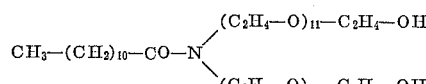

(3) 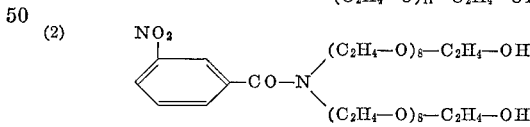

or if they are derived from sulfonamides, they correspond to the general formulae $$R-[SO_2-N-(C_2H_5-O)_x-C_2H_4-OH]_u$$
$$\phantom{R-[SO_2-N}R_1$$

and

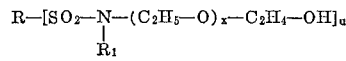

for example, (1) 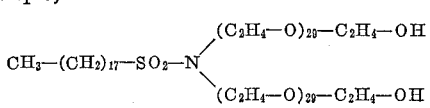

(2) 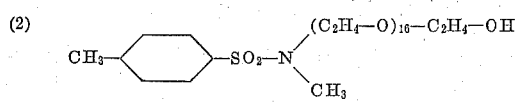

The above named groups of compounds (A) to (F) represent the commonly used types of compounds; in addition to these groups there can also be used as starting substances for the present process other groups of compounds corresponding to the general Formula I. There may be mentioned by way of example:

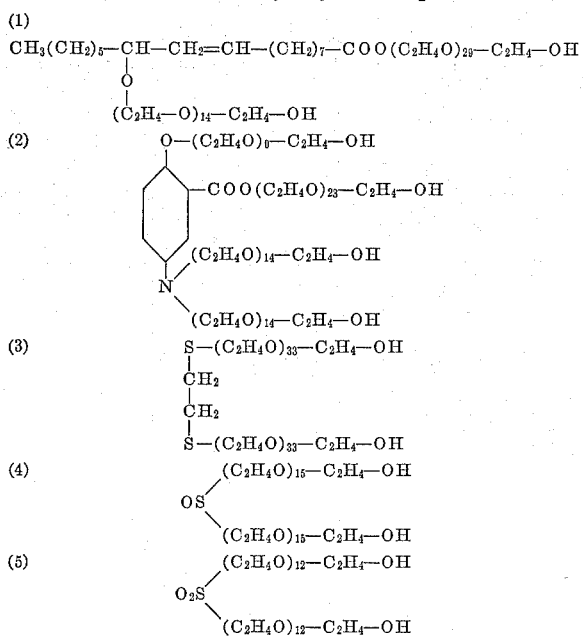

As phosphatization agents for the esterification of the compounds of the products specified above under (A) to (F) as well as those of the specific starting materials specified in the preceding paragraph, there are mentioned by way of example: ortho-phosphoric acid, meta-phosphoric acid, pyro-phosphoric acid, polyphosphorus acids derived by dehydration from ortho-phosphoric acid, phosphorus oxychloride, phosphorus pentoxide.

(G) Carboxylic acids which may be used as an additional esterification component for the compounds of the groups (A) to (F) in addition to one of the phosphatization agents specified above, are, for example, undecane acid, lauric acid, myristic acid, pentadecane acid, stearic acid, arachic acid, behenic acid, montanic acid, undecylenic acid, oleic acid, erucic acid, linoleic acid, linolenic acid, adipic acid, azelaic acid, sebacic acid, itaconic acid, citraconic acid, dodecylbenzoic acid, nonylnaphthoic acid, tert.butyl-phenoxy-acetic acid, butyl-oxyacetic acid, and acids from natural products, for example ricinoleic acid, commercial mixtures of naphthenic acids, resin acids, tall oil fatty acids, linseed oil fatty acid, wood oil fatty acid, coconut oil fatty acid, tallow fatty acid, peanut oil fatty acid, olive oil fatty acid, fish oil fatty acid, citric acids.

In the above-indicated compounds there may stand for the pure polyethylene glycol chains also mixed polyalkylene glycol chains according to the general Formula I. The polyalkylene chains may then contain in any desired sequence butylene oxide and/or propyleneoxide members, however, the chains must always terminate with an ethylene glycol radical.

The preparation of all polyethylene oxide addition products used as starting substances in the present process does not form the subject matter of the present invention. The starting substances are prepared in known manner, generally by the action of alkylene oxide in a compound containing a reactive hydrogen atom in the presence of alkali or acid catalysts, such as potassium hydroxide solution and borontrifluoride, or in some cases by the reaction of compounds containing a reactive hydrogen atom with polyglycol or halogenhydrine.

Of course, there may also be used in the present process several different compounds of the general Formula I or Ia in mixture with one another, thus offering the possibility of largely varying the final condensation products in order to prepare products that have, for any desired purpose, optimum and specific properties.

The mixed esters of phosphoric acid and carboxylic acid are prepared either by first phosphatizing a compound of the groups (A) to (F) and then further esterifying with a carboxylic acid, or by simultaneously reacting the compound of the groups (A) to (F) with a carboxylic acid and with a phosphatizing agent.

The condensation products of the groups (A) to (F) have the nature of monohydric or polyhydric alcohols, depending on whether they contain in their molecule one or several polyalkylene glycol chains. The products that have the nature of monohydric alcohols yield on reaction with the trivalent phosphoric acid, tertiary phosphates which are not cross-linked and have defined molecular weights and which yield aqueous solutions that have a relatively low viscosity. The products that have the nature of bi- or polyhydric alcohols yield on reaction with the trivalent phosphoric acid, extensively cross-linked products the esterification of which cannot be completed because they become so viscous at 240° C. that they can no more be stirred. They also are not soluble in water, but only swellable. In order to be able to complete the esterification of the phosphoric acid, the esterification is carried out with a quantity of phosphatizing agent smaller than the equivalent quantity, so that free hydroxyl groups are preserved in the final product. It is more advantageous to incorporate in the molecule monobasic carboxylic acids or ethylene oxide condensation products that have the nature of monohydric alcohols, which allow a free adjustment of the degree of cross-linkage.

As basic components for the novel condensation products that may be prepared in accordance with the process of the present invention, there may be used, for example:

(1) Alcohols, such for example, as saturated or unsaturated, aliphatic alcohols or polyalcohols containing 1 to about 10 hydroxyl groups and 1 to about 20 carbon atoms. As example there are mentioned: glycerin, pentaerythrite, hexanediol, trimethylol propane, sorbitol, starch, sugar (hexoses, pentoses, etc.), higher fatty alcohols, octadecanediol or thioalcohols, (2) Aromatic oxy-compounds, such as phenol or naphthol, as well as derivatives and substitution compounds thereof, (3) Saturated and unsaturated carboxylic acids containing 1 to about 30 carbon atoms, such as natural or synthetic fatty acids, further polycarboxylic acids containing 2 to 4 carboxyl radicals as well as hydroxycarboxylic acid, (4) Aliphatic, araliphatic, aromatic or cycloaliphatic amines containing 2 to about 20 carbon atoms, (5) Acid amides that are derived from sulfonic acids or carboxylic acids.

Depending on the type of the basic material chosen, the number and length of the polyethylene glycol chains present in the molecule and the number of free hydroxyl groups that are available for the condensation reaction according to the present invention, the molecular weights and other properties of the products can be varied within wide limits.

Depending on the degree of condensation and the functional groups present in addition to the polyethylene chain, the condensation products prepared according to this invention are in more or less highly viscous form soluble to swellable in water. They are likewise more or less soluble in polar organic solvents, such as chlorinated hydrocarbons, alcohols, esters, ketons and aromates, but they are not soluble in non-polar solvents.

The following examples illustrate the invention but they are not intended to limit it thereto:

Example 1

500 grams of polyethylene glycol having a molecular weight of 1000 are dissolved in 100 g. of ethylene chloride, 26 g. of POCl₃ are added dropwise at 80° C. while stirring and the whole is heated under reflux until hydrochloric acid is no longer split off. After having distilled off the ethylene chloride there are then added 134 g. of stearic acid and the mixture is slowly heated to 240° C. while simultaneously nitrogen is passed through. The water liberated by the esterification and a few organic cleavage products are thereby separated by distillation. After a reaction of 4–6 hours at 240° C., the molten mass is discharged. There are obtained in this manner 600 g. of a light mass which is wax-like and solid in the cold. The reaction product has an acid number of 2.6.

When the phosphate stearate of the polyglycol intermediarily formed in this method of operation is not heated over 170° C., its aqueous solution of 10% strength has at 20° C. a viscosity of 21 centipoises; if, however, this phosphate stearate is further treated thermically in accordance with the present invention, the reaction product then obtained has in an aqueous solution of 10% strength at 20° C. a viscosity of 47,000 cp.

Example 2

2500 g. of polyglycol having a molecular weight of 1000 are slowly heated under a pressure of 15 mm. Hg on the descending cooler to 240° C. with 675 g. of oleic acid and 165 g. of ortho-phosphoric acid of 100% strength, while intensively stirring and this temperature is maintained for 5 hours. There are obtained 2800 g. of a soluble reaction product which is soluble in water to give a clear solution. The reaction product has an acid number of 1.5.

Example 3

In accordance with Example 2, 500 g. of polyethylene glycol having a molecular weight of 5000 are reacted with 26.8 g. of stearic acid and 6.6 g. of phosphoric acid of 100% strength and there is obtained a condensation product which has in aqueous solution of 5% strength at 20° C. a viscosity of 23,000 cp. The reaction product has an acid number of 0.5.

Example 4

Similar to the method of Example 1, 500 g. of polyethylene glycol having the molecular weight of 1000 are reacted with 26 g. phosphoroxy chloride to the phosphor semi-ester, 50.5 g. of sebacic acid are then added and the whole is heated while introducing nitrogen at 240° C. until condensation takes place. There is obtained in good yield a condensation product in the form of a light, solid, in water clearly soluble mass that has film-forming properties. The reaction product has an acid number of 0.7.

Example 5

486 g. of a condensation product of glycerin with 21 moles of ethylene oxide are reacted as described in Example 1 with 142 g. of stearic acid and 30 g. of orthophosphoric acid of 100% strength. The reaction product so obtained dissolves in water to clear, viscous solutions. The reaction product has an acid number of 3.0.

Example 6

474 g. of a condensation product of pentaerythrite with 40 moles of ethylene oxide are reacted in accordance with the method of Example 2 with 134 g. of stearic acid and 17 g. of orthophosphoric acid of 100% strength. After about 2 hours, there is formed a very viscous melt which is difficultly soluble in water. It dissolves in ethylene diglycol and may then be diluted with water to give a clear solution. The reaction product has an acid number of 1.2.

In a manner analogous to that described in the working methods of Examples 1 to 5, there can be prepared and further processed in the sense of this invention e.g. the phosphoric acid esters of condensation products of octadecanediol with 40 moles of ethylene oxide, of paratoluenesulfonamide with 40 moles of ethylene oxide, of stearyl amine with 48 moles of ethylene oxide, of pyrocatechol with 20 moles of ethylene oxide, and of aniline with 20 moles of ethylene oxide.

Example 7

342 g. of a condensation product of glycerin with 60 moles of ethylene oxide and 250 g. of polyethylene glycol having a molecular weight of 2000 are dissolved in 100 g. of ethylene chloride, 20 g. of phosphoroxychloride are added, the whole is boiled on the reflux cooler until the cleavage of hydrochloric acid ceases, the solvent is removed by distillation, 67 g. of stearic acid is added, the whole is then slowly heated to 240° C., while carbon dioxide is passed through, and said temperature is maintained for 2 to 4 hours until the reaction mixture becomes viscous. The aqueous solution of 5% strength of the reaction product that has solidified to a wax-like mass has at 20° C. a viscosity of 36,500 cp. The reaction product has an acid number of 2.0.

Example 8

In accordance with the process employed in Example 7, 333 g. of polyethylene glycol having a molecular weight of 1000 and 214 g. of a condensation product of stearyl alcohol with 8.8 moles of ethylene oxide are reacted with 51 g. of phosphoroxychloride and the whole is treated in the manner described. There is obtained a clear melt having a petroleum jelly-like consistency, and which has at 20° C. in aqueous solution of 10% strength a viscosity of 38,200 cp. The reaction product has the acid number 0.3.

Example 9

In the same manner as described in Example 7, a mixture of 342 g. of a condensation product of glycerin with 60 moles of ethylene oxide and 250 g. of polyethylene glycol having a molecular weight of 1000 is partially esterified with 19.5 g. of phosphoroxychloride, 67 g. of stearic acid is then added and the mixture is then held for 5 hours at 240° C. while passing through a stream of nitrogen. There is obtained a condensation product which in an aqueous solution of 10% strength has a viscosity of 156,000 cp. at 20° C. The reaction product has an acid number of 1.8.

Example 10

500 g. of polyethylene having a molecular weight of 1000 are slowly heated under a pressure of 15 mm. Hg to 240° C. with 134 g. of stearic acid and 33 g. of orthophosphoric acid and held at this temperature for six hours. After having cooled, there is obtained a wax-like condensation product which exhibits in an aqueous solution of 10% strength and at 20° C. a viscosity of 7850 cp. The reaction product has an acid number of 1.3.

When in this formulation the ortho-phosphoric acid is replaced by the same amount of pyrophosphoric acid or metaphosphoric acid, there are obtained condensation products the aqueous solutions of 10% strength of which exhibit at 20° C. a viscosity of 1670 cp.

Example 11

488 g. of propylene glycol-oxethylate from 30% propylene oxide and 70% ethylene oxide, molecular weight 4880, are dissolved in 200 g. of ethylene chloride, and reacted with 10.2 g. of POCl₃ and, after having removed the solvent by distillation, heated for 5 hours to 240° C. while passing through a stream of nitrogen. The reaction product is a clear aqueous solution, the viscosity of which is strongly increasing while raising the temperature. The reaction product has an acid number of 1.6.

Example 12

103.6 g. of phosphoxychloride are added dropwise while stirring to 600 parts by weight of polyethylene glycol, molecular weight of 600, and the whole is heated to 90° C. As soon as the strong evolution of hydrochloric acid has terminated, the whole is slowly heated on a descending cooler to 240° C. After having stirred for about 2 hours at this temperature, during which time about 100 parts by weight of easily volatile components are removed by distillation, the reaction mass becomes thick and viscous. It is highly viscous, stringy, elastic, slightly yellow, and solidifies after having been allowed to stand for several hours at room temperature to form a turbid wax. Yield: 560 parts by weight (including phosphoric acid).

Example 13

In the same manner as in Example 12, 600 parts by weight of polyethylene glycol of a molecular weight of 600, are reacted with 48 parts by weight of phosphorus pentoxide. The condensation product is formed by heating to 230–240° C. and resembles to that of Example 1.

Example 14

400 parts by weight of polyethylene glycol of a molecular weight of 800, and 33 parts by weight of orthophosphoric acid of 100% strength are cycled out with 100 parts of tetraline up to 220° C. About 17 parts by volume of a liquid that is insoluble in Tetralin are thereby separated in the water trap, whereas the reaction mass becomes increasingly more viscous. The condensation having progressed to the desired degree, the Tetralin is removed by distillation under reduced pressure. There is obtained a condensation product that has similar properties as those of the products of Examples 1 and 2.

Example 15

600 parts by weight of polyethylene glycol of a molecular weight of 3000, and 13 parts by weight of orthophosphoric acid of 100% strength are heated on an appropriate heating bath to 240° C. while continuously separating by distillation under reduced pressure (15 mm. Hg) an easily volatile liquid until a viscous melt is formed. There are obtained 593 parts by weight of a transparent, rubber-like tough viscous, yellowish-brown mass, which solidifies upon standing at room temperature for several hours to a slightly opaque hard wax.

Example 16

1000 parts by weight of polyethylene glycol, molecular weight 1000, and 66 parts by weight of orthophosphoric acid of 100% strength are heated on the heating bath, while well stirring and at a pressure of 12 mm. Hg, within 2 hours to 240° C. With a distillation loss of 36 parts by weight, there are obtained 994 parts by weight of a condensation product.

Example 17

500 g. of polyethylene glycol (2000)-semi-phosphate having an acid number of 10.2, prepared by heating about 500 g. of polyethylene glycol having a molecular weight of 2000 with 13 g. of phosphoroxy-chloride, are heated to 240° C. while passing through 55 l./hour of nitrogen. After a reaction period of 5 hours there is obtained a product having an acid number of 1.3.

390 g. of this product are heated with 52 g. of stearic acid for 8 hours to 240° C. while passing through 50 l./h. of nitrogen. The acid number of the reaction product is 4.2. Upon determination of the viscosity, an aqueous solution of the product of 10% strength in a Ford viscosimeter with nozzle 8 and 25° C. shows a passage time of 18 minutes and 32 seconds.

Example 18

500 g. of polyethylene glycol having a molecular weight of 2000 are heated for 5 hours to 240° C. together with 67 g. of stearic acid and 8.25 g. of phosphoric acid while passing through nitrogen.

In the reaction, a distillation loss of 19 g. of organic substance and 4 g. of water occurs. The acid number of the reaction product amounts to 3.3. The product is a yellowish solid wax, the aqueous solution of 10% strength of which exhibits in the Ford viscosimeter with nozzle 8 a passage period of 12 minutes and 5 seconds.

Example 19

705 g. of the product of the condensation of a p-sec.-butylphenol-formaldehyde resin with 60 mols of ethylene oxide per weight equivalent of resin, in the presence of an acid catalyst, are treated for 2 hours to 240° C. with 17 g. of orthophosphoric acid of 85% strength while passing through a stream of nitrogen. The viscosity of the melt is rapidly increased while the acid number falls to 2.

The reaction product is a hard wax which yields highly viscous aqueous solutions.

Example 20

500 g. of polyethylene glycol having a molecular weight of 2,000 are reacted with 170 g. of the product of the condensation of tri-sec.-butylphenol with 10 mols of ethylene oxide, and with 38.5 g. of phosphorus oxychloride according to the method described in Example 19, until after 6 hours the acid number falls to 2.5.

The reaction product constitutes a light, semi-solid mass which is clearly soluble in water and exhibits marked surface-active properties.

A 20% aqueous solution thereof shows in a DIN cup with the nozzle 4 at 25° C. a passage time of 7 minutes and 30 seconds.

Example 21

590 g. of a condensation product of octadecanediol with 60 mols of ethylene oxide are heated for 6 hours to 240° C., while passing through nitrogen, with (a) 5.2 g. of ortho-phosphoric acid (85% strength) corresponding to 1/3 equivalent,
(b) 7.75 g. of ortho-phosphoric acid (85% strength) corresponding to 1/2 equivalent,
(c) 10.4 g. of ortho-phosphoric acid (85% strength) corresponding to 2/3 equivalent,
(d) 15.5 g. of ortho-phosphoric acid (85% strength) corresponding to 3/3 equivalent.

In the case of (a), (b) and (c), the bright wax-like reaction products obtained have an acid number of 0, while (c) has an acid number of 2.9.

The viscosities of aqueous solutions of 10% strength at 20° C. are:

| | Cp. |
|---|---|
| Starting material | 12.4 |
| Product obtained according to (a) | 101.6 |
| Product obtained according to (b) | 625 |
| Product obtained according to (c) | 26,780 |

The product obtained according to (d) is only swellable in water.

I claim:

1. A process for the manufacture of surface-active polyalkylene-glycol derivatives, comprising esterifying a compound of the formula

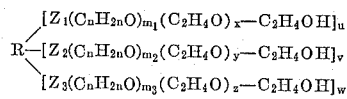

wherein $n$ stands for the integers 3 or 4, $u$ stands for an integer from 1 to 10, $v$ and $w$ represent integers from 0 to 10, $x$, $y$ and $z$ represent values from 1 to 200, $m_1$, $m_2$ and $m_3$ represent values from 0 to 200, the sum of the values of the correlated integers $x$ and $m_1$, $y$ and $m_2$, and $z$ and $m_3$ not exceeding in each case values ranging from 1 to 200, $Z_1$, $Z_2$ and $Z_3$ represent a member selected from the group consisting of oxygen, sulfur, —COO—, —CONR$_1$—, —SONR$_1$—, —SO— and —SO$_2$—, wherein $R_1$ stands for a member selected from the group consisting of a lower alkylene radical and a radical of the formula $$—(C_nH_{2n}O)_{m_1}(C_2H_4O)_x—C_2H_4OH$$

wherein $m_1$, $n$ and $x$ have the meaning given above and R stands for a radical selected from the group consisting of phenyl, hydrogen, naphthyl, substituted phenyl or naphthyl wherein the substituents are chloro, nitro or alkyl having up to 12 carbon atoms, phenyl or naphthyl linked by lower alkylene, —CO—, —SO— or —SO$_2$—, alkyl having up to 30 carbon atoms, phenyl substituted alkyl having up to 30 carbon atoms in the alkyl, naphthyl substituted alkyl having up to 30 carbon atoms in the alkyl, alkyl containing up to 30 carbon atoms having oxygen in its chain, hydrocarbylcycloaliphatic having from 5 to 22 carbon atoms, phenyl substituted hydrocarbylcycloaliphatic having from 5 to 22 carbon atoms, alkyl substituted hydrocarbylcycloaliphatic having from 5 to 34 carbon atoms or a radical of the formula $$—(C_nH_{2n}O)_{m_1}(C_2H_4O)_x—C_2H_4OH$$

wherein $m_1$, $n$ and $x$ have the meaning defined above, by heating to 190 to 280° C. for 5 minutes to 25 hours with a member selected from the group consisting of ortho-phosphoric acid, phosphorus oxy chloride, phosphorus pentoxide, metaphosphoric acid, pyrophosphoric acid, and a polyphosphorus acid formed by further dehydration from ortho-phosphoric acid, and continuously and simultaneously removing volatile by-products liberated during the reaction to form a product having the acid number within the range of 0 to 4.

2. A process as claimed in claim 1, in which a polyethylene glycol of a molecular weight from 600 to 5,000 is simultaneously reacted with an aliphatic mono-basic to tetrabasic acid with 6 to 30 carbon atoms and a phosphorylating agent selected from the group consisting of ortho-phosphoric acid, phosphorus oxychloride, phosphorus pentoxide, meta-phosphoric acid, pyrophosphoric acid and polyphosphorus acids derived by dehydration from ortho-phosphoric acid.

3. The process as claimed in claim 2 in which during the reaction a continuous stream of nitrogen is passed through the reaction mixture.

4. A process as claimed in claim 1, in which a condensation product of propylene oxide and ethylene oxide with a molecular weight of up to about 5,000 is phosphorylated with an agent of the group consisting of ortho-phosphoric acid, phosphorus oxychloride, phosphorus pentoxide, meta-phosphoric acid, pyrophosphoric acid and polyphosphorus acids derived by dehydration from ortho-phosphoric acid, while passing a stream of nitrogen through the reaction mixture and continuously removing volatile by-products liberated in the reaction until a product is formed, the acid number of which ranges from 0 to 4.

5. The process as claimed in claim 1 wherein the reaction is carried out under reduced pressure.

6. The process as claimed in claim 1 wherein an inert gas is passed through the reaction mass.

7. The process as claimed in claim 1 wherein an inert solvent is added to the reaction mass.

8. The process for the manufacture of surface-active polyalkylene glycol derivatives according to claim 1 in which the compound of said general formula is formed in situ during phosphatization by oxethylating a compound of the formula

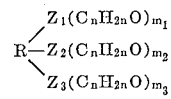

and wherein R, $Z_1$, $Z_2$, $Z_3$, $n$ and $m$ have the same meaning as defined in claim 1.

9. A process as claimed in claim 1, in which a polyalkylene glycol with a molecular weight from 600 to 5,000 is separately reacted in two steps with an aliphatic mono-basic to tetrabasic acid with 6 to 30 carbon atoms and a phosphorylating agent selected from the group consisting of ortho-phosphoric acid, phosphorus oxychloride, phosphorus pentoxide, metaphosphoric acid, pyrophosphoric acid and polyphosphorus acids derived by dehydration from ortho-phosphoric acid, while continuously passing a stream of nitrogen through the reaction mixture, the sequence of both steps being chosen ad libitum.

10. The process according to claim 1 wherein the reaction is carried out in an inert liquid serving as an entrainer for the volatile by-products from the cycle and selected from the group consisting of ethylene chloride, tetraline, carbon tetrachloride, benzene, xylene, tetrahydrofurane, dialkyl glycol ethers, dibutyl ethers, and dioxane.

11. A process for the manufacture of surface active derivatives of polyalkylene glycols, in which a compound selected from the group consisting of polyethylene glycols; mixed polyalkylene glycols containing a plurality of units of a member selected from the group consisting of ethylene oxide, propylene oxide, butylene oxide and mixtures thereof, and carrying at least one ethylene oxide group in terminal position and having molecular weights from 88 up to 5000; ethers of said polyethylene glycols and of said mixed polyalkylene glycols with a member selected from the group consisting of aliphatic alcohols containing up to 10 hydroxy groups and up to 20 carbon atoms, phenyl and naphthyl alcohols, substituted phenyl and naphthyl alcohols wherein the substituents are alkyl, nitro or chloro and formaldehyde derivatives of said phenyl and naphthyl alcohols; esters of said polyalkylene glycols and of said mixed polyalkylene glycols with a member selected from the group consisting of alkyl carboxylic acids containing 8 to 30 carbon atoms and alkyl polycarboxylic acids containing 2 to 4 carboxy radicals and products of said polyalkylene glycols and of said mixed polyalkylene glycols formed by addition with acid amides derived from a member selected from the group consisting of sulfonic acids and carboxylic acids, is reacted at a temperature between 190 to 280° C. for a period of five minutes to 25 hours with a member selected from the group consisting of ortho phosphoric acid, phosphorus oxychloride, phosphorous pentoxide, metaphosphoric acid, pyrophosphoric acid and polyphosphorous acids formed by further dehydration from orthophosphoric acids while continuously and simultaneously removing volatile by-products liberated during the reaction, until a product having an acid number within the range of 0 to 4 is formed.

References Cited by the Examiner

UNITED STATES PATENTS

| | | | |
|---|---|---|---|
| 1,917,251 | 7/1933 | Harris | 260—403 |
| 2,026,785 | 1/1936 | Harris | 260—403 |
| 2,133,690 | 10/1938 | Epstein et al. | 260—403 |
| 2,243,868 | 6/1941 | Katzman | 260—403 |
| 2,643,261 | 6/1953 | Matuszak et al. | 260—403 |
| 2,712,511 | 7/1955 | Orozco et al. | 260—461 |
| 2,755,296 | 7/1956 | Kirkpatrick | 260—403 |
| 3,004,056 | 10/1961 | Nunn et al. | 260—403 |
| 3,004,057 | 10/1961 | Nunn | 260—403 |

CHARLES B. PARKER, *Primary Examiner.*

DANIEL D. HORWITZ, ANTON H. SUTTO,
*Assistant Examiners.*